United States Patent [19]

White et al.

[11] 3,816,851

[45] June 11, 1974

[54] MAGNETIC TAPE PLAYING AND CHANGING APPARATUS

[75] Inventors: Rowland Kent White, Rockville; Simon Lloyd Lindbeck, Bowie, both of Md.

[73] Assignee: Telex Communications, Inc., Minneapolis, Minn.

[22] Filed: Aug. 5, 1971

[21] Appl. No.: 169,484

Related U.S. Application Data

[62] Division of Ser. No. 808,110, March 18, 1969, Pat. No. 3,463,962.

[52] U.S. Cl. .............................................. 360/92

[51] Int. Cl. .............................................. G11b 5/00

[58] Field of Search ................. 353/15, 19; 274/4 F; 242/180, 181; 179/100.2 Z; 352/6–8, 123

[56] References Cited

UNITED STATES PATENTS 3,408,139 10/1968 Schwartz ............................ 274/4 F 3,512,785 5/1970 Ban ..................................... 274/4 F

*Primary Examiner*—Harry N. Haroian

[57] ABSTRACT

A plurality of tape cartridges are held in a rotary magazine. Mechanism is provided for indexing the magazine so as to move a particular cartridge to a play (or record) position. At the play position, the selected tape cartridge is shifted into engagement with a friction drive forming a part of the power train for indexing the magazine and shifting cartridges. A magnetic pick-up (or record) head has an independent drive enabling the head to register with each of a plurality of tape channels. The entire apparatus is characterized by simplicity, compactness and economy as well as durability.

14 Claims, 14 Drawing Figures

MAGNETIC TAPE PLAYING AND CHANGING APPARATUS

This is a divisional application of Ser. No. 808,110, filed Mar. 18, 1969, in the names of Rowland K. White and Simon L. Linbeck, now United States Letters Patent No. 3,643,962, issued Feb. 22, 1972.

BACKGROUND OF THE INVENTION

The invention has come into existence as a result of an increasing need in the art for a simplified and economical playing and changing apparatus for magnetic tapes in cartridges. As is well known, these tapes are now widely used in automobiles as well as in the household. The typical automobile tape cartridge player is manual and has no provision for automatic selection or changing. Tape cartridge changers are known in the prior art and, in general, these prior art devices are not at all suited to satisfy the needs of the art for a lightweight, compact apparatus which is reliable in operation and sufficiently economical to be practical for automotive usage and also for embodiment in portable household units and the like. The invention is equally adaptable for use with such recording media as punched paper tape and film. Other applications are for information storage, programming and the like.

Therefore, the principal objective of the invention is to satisfy the existing and ever-increasing need for a simplified tape cartridge player and changer for the above-stated purposes. Other objects and advantages of the invention will be readily apparent during the course of the following description.

DETAILED DESCRIPTION OF PREFERRED EMBODIMENTS

Figure 1:
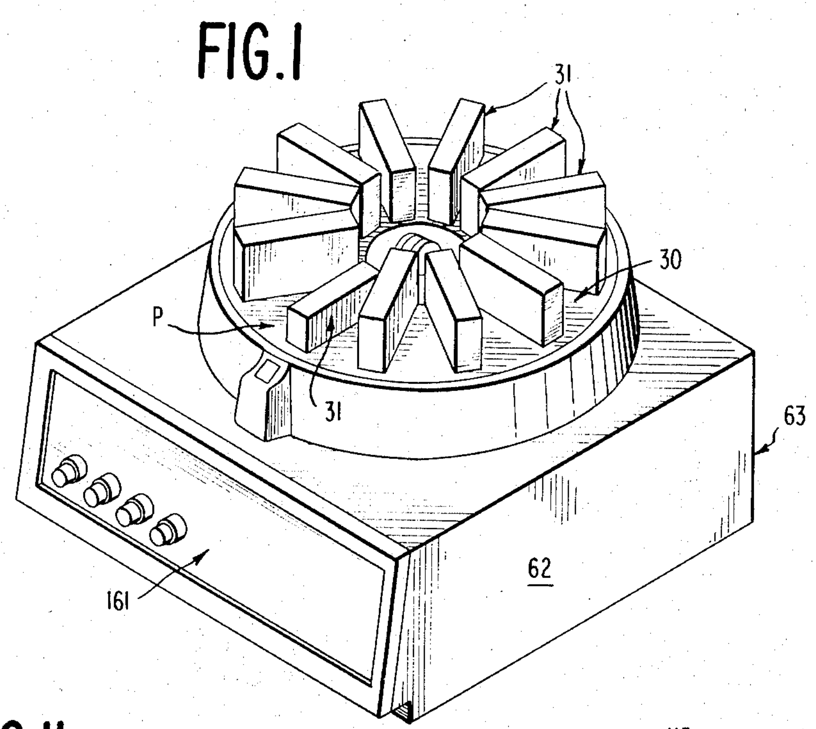
FIG. 1 is a partly diagrammatic perpsective view of a tape cartridge player and changer embodying the invention.

As employed herein, the terms "play", "play position" and "pick-up head" are intended to encompass "record", "record position" and "recorder head". It should also be understood throughout the description that the tape cartridge player has both stereo and monaural capabilities in connection with the multi-channel tapes employed.

Referring to the drawings in detail, wherein like numerals designate like parts, and referring first to FIGS. 1 through 15, the numeral 30 designates a vertical axis rotary magazine for moving a plurality of conventional magnetic tape cartridges 31 to and from play and nonuse or storage positions according to the desires of the user. In the illustrated embodiment, the magazine carries twelve tape cartridges 31 in circumferentially equidistantly spaced relation around the rotational axis of the magazine, although this number may be varied in some instances.

Figure 3:
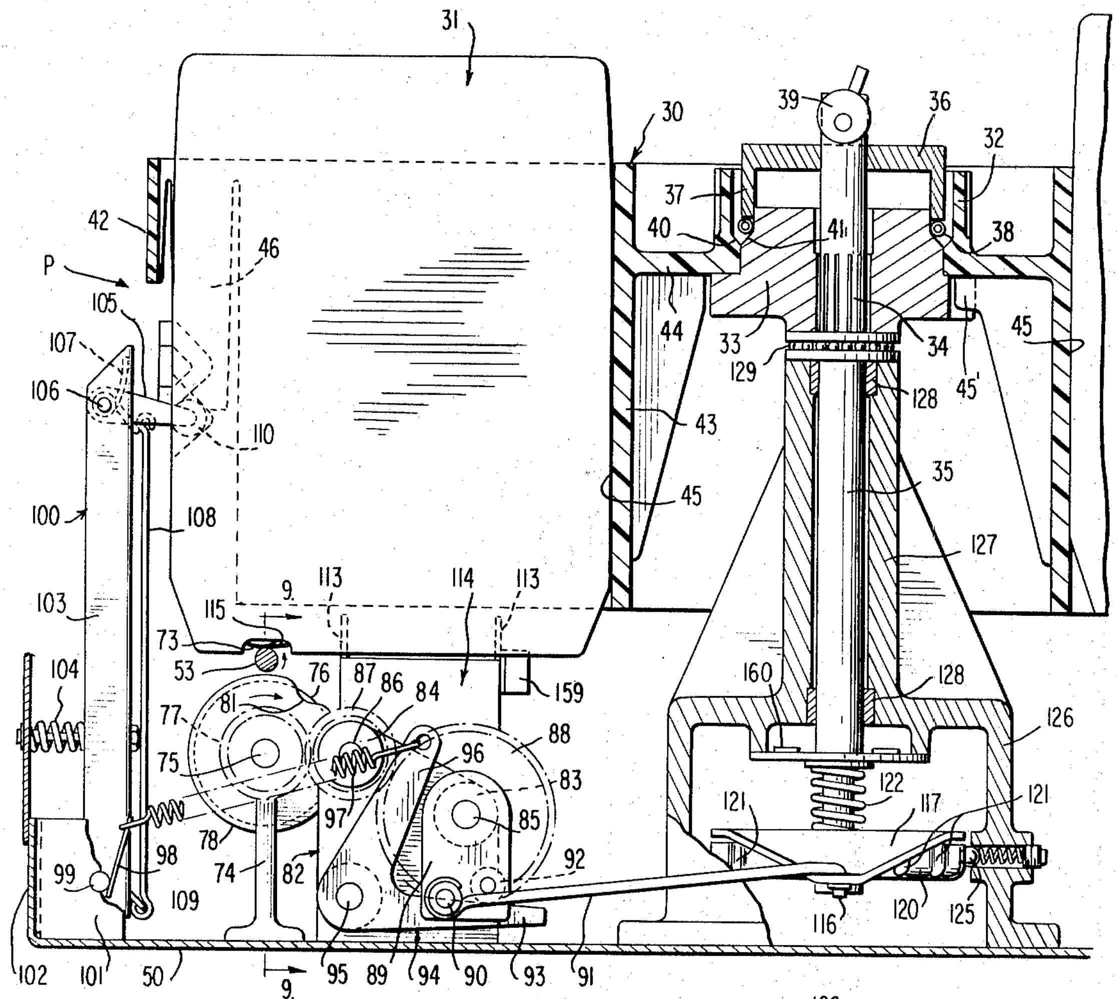
FIG. 3 is a fragmentary vertical section taken on line 3—3 of FIG. 2.

The magazine 30 includes a central hub 32 engageable releasably over a drive head 33 which is splined at 34 to a main vertical drive or magazine index shaft 35. The hub 32 is coupled to the head 33 tightly through the medium of a cap 36 whose annular side wall 37 fits over a somewhat reduced upper portion of the head 33 and engages a compressible annulus 38, such as an ordinary O-ring seal. When the coupling cap 36 is forced downwardly relative to the shaft 35 and head 33 by an eccentric cam device 39 on the upper end of the shaft, the wall 37 will force the annulus 38 into frictional engagement with diverging faces 40 and 41 of the hub 32 and head 33, respectively, and when this occurs, the magazine 30 is firmly coupled to the drive head to turn therewith. When the cam element 39 and cap 36 are released, as shown in FIG. 3, the entire magazine 30 may be lifted and removed from the remainder of the apparatus. An indexing lug 45' on magazine 30 interfits with a notch on head 33 to assure correct registry of the magazine.

The magazine 30 further includes an outer rim 42 at its top and an interior annular wall 43 concentric with the hub 32 and rim and interconnected with the hub through a horizontal web 44. Other minor constructional details of the magazine 30 may vary and need not be described for the purposes of this invention. The magazine is well adapted to be molded from plastic but may in fact be formed of any suitable material. The magazine 30 has plural circumferentially equidistantly spaced vertical slots 45 for the several cartridges 31, receiving the same snugly but allowing free vertical guided movement of the cartridges relative to the magazine. These slots 45 radiate from the center of the magazine around the vertical rotational axis thereof; the several slots 45 are open at their tops and bottoms so that each cartridge may project somewhat above and below its magazine slot while in the play position, FIG. 3.

Figure 4:
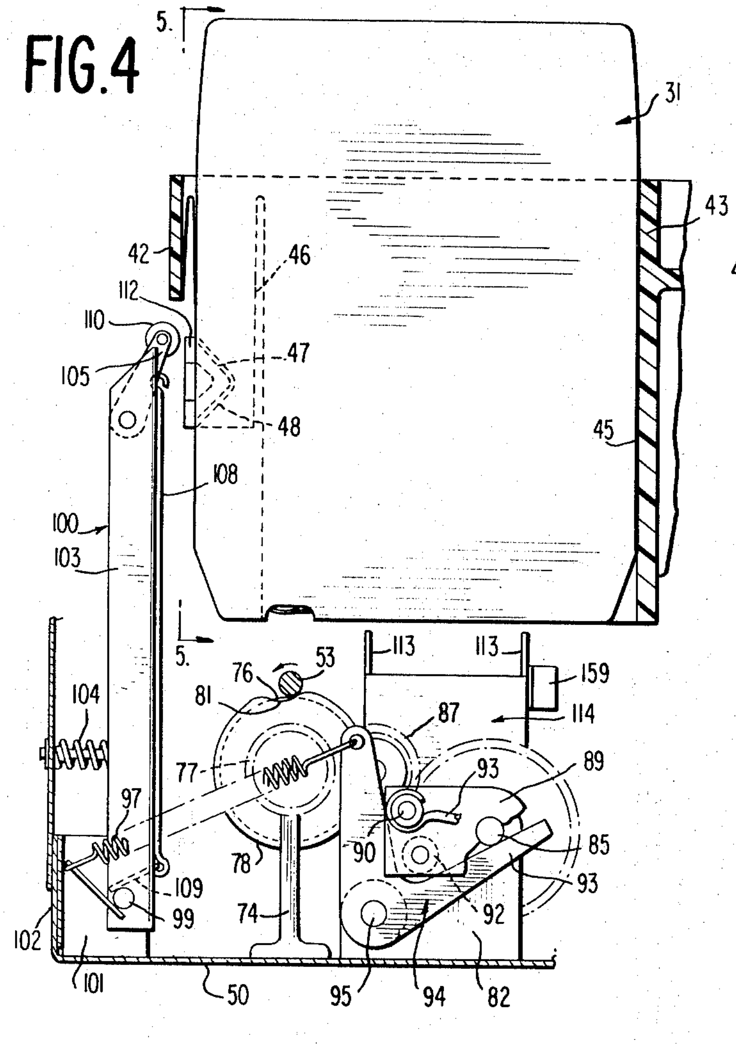
FIG. 4 is a fragmentary sectional view similar to FIG. 3 showing a tape cartridge and coacting shifter mechanism in a release position at the playing station.
Figure 5:
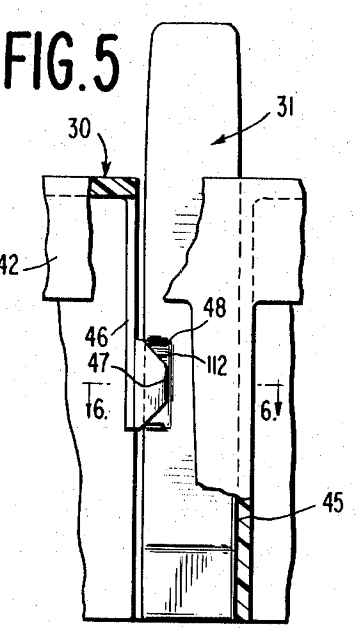
FIG. 5 is a fragmentary vertical section taken on line 5—5 of FIG. 4.
Figure 6:
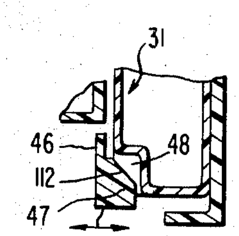
FIG. 6 is a fragmentary horizontal section taken on line 6—6 of FIG. 5.

Adjacent to the outer side of each cartridge slot 45, the magazine 30 is equipped with an integral spring finger 46, FIGS. 5 and 6, depending from the rim 42 and having at its lower end a tapered detent head 47 for entry into an existing conventional tapered notch 48 in the outer vertical edge face of the conventional plastic cartridge 31. Thus, when each cartridge 31 is introduced downwardly into one of the slots 45, the detent head or element 47 on the resilient finger 46 will snap into the notch 48 and releasably secure the cartridge in a normal partly elevated non-play position, shown particularly in FIGS. 4 and 5. The cartridges are in this position while indexing with the magazine 30, as will be described in detail.

Figure 2:
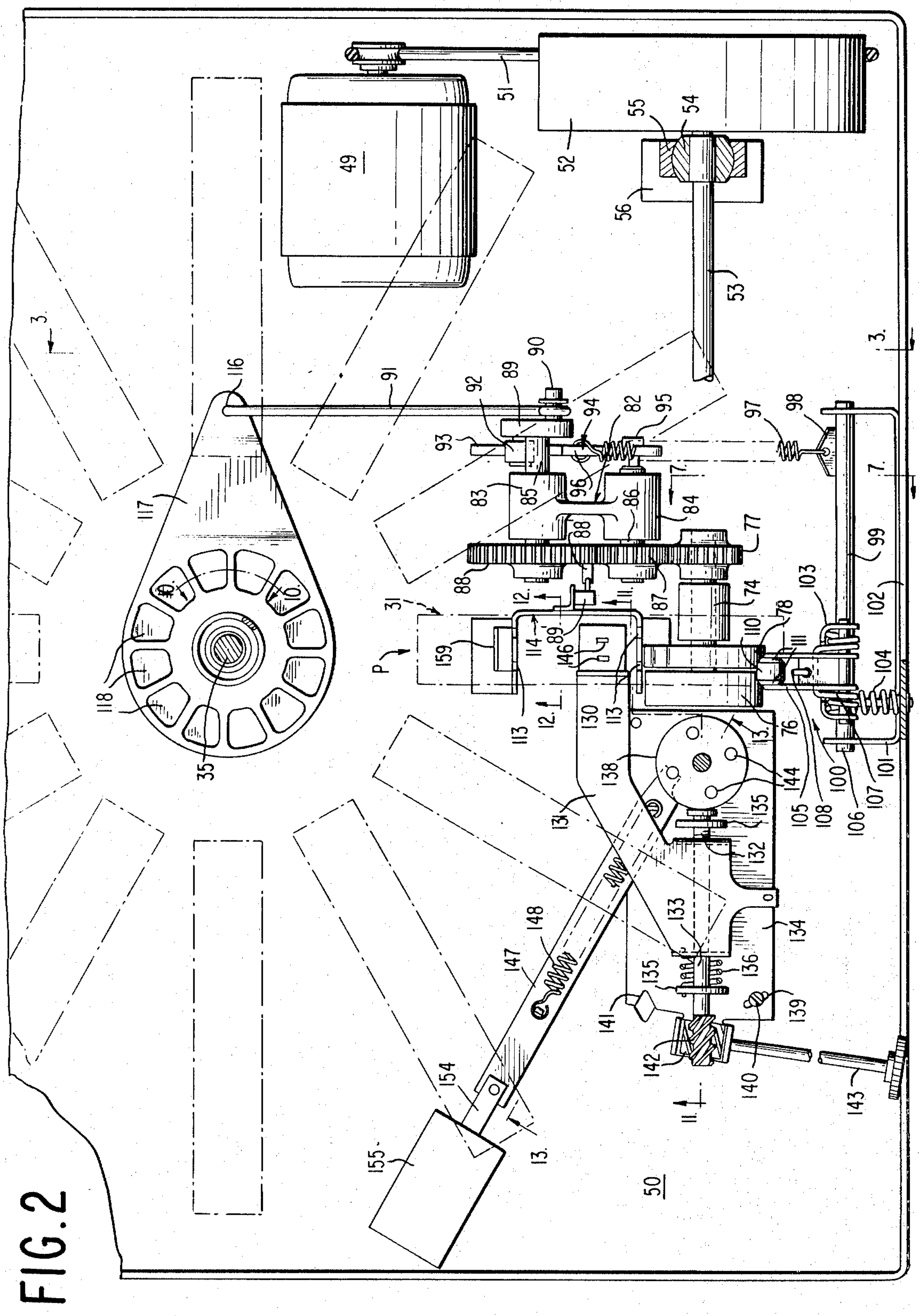
FIG. 2 is a fragmentary plan view of the apparatus partly in horizontal cross section and with parts broken away and omitted for clarity.

The power train means for the apparatus, FIG. 2, comprises an electric motor 49 secured to a suitable base plate 50 and drivingly connected by a transmission belt 51 to a flywheel 52. in turn connected with and driving a horizontal capstan 53. This capstan has a first universal swivel support bearing near the flywheel including an interior spherical component 54 and an interfitting exterior or female component 53 held within a suitable bracket 56 suitably secured to the base plate 50. As shown in FIG. 2, the capstan 53 is spaced considerably from the vertical drive or index shaft 35 near one side of the apparatus and is substantially perpendicular to the shaft 35.

Figure 7:
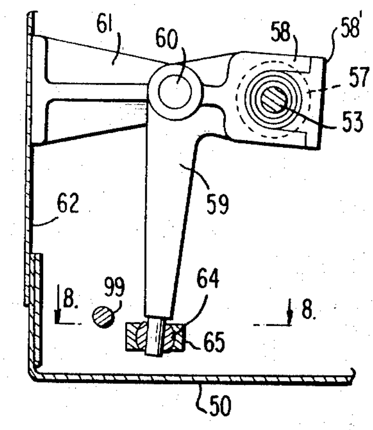
FIG. 7 is a fragmentary vertical section taken on line 7—7 of FIG. 2.
Figures 8, 9:
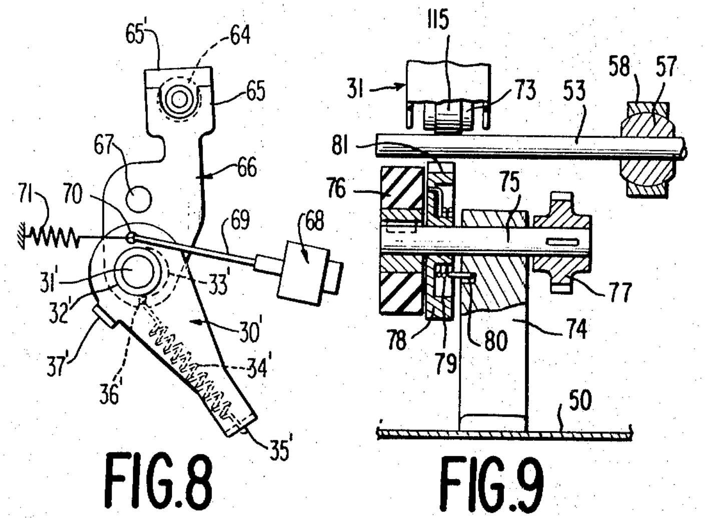
FIG. 8 is a horizontal section taken on line 8—8 of FIG. 7.
FIG. 9 is a fragmentary vertical section taken on line 9—9 of FIG. 3.

The capstan 53, FIG. 9, extends to a point substantially opposite the shaft 35, and relatively close to its end has a second swivel support bearing including an inner spherically curved element 57 and a coacting outer bearing element 58 with retainer cap 58'. The bearing element 58 forms a part of a vertically swingable bell crank 59, FIG. 7, pivoted at 60 to a fixed bracket 61 mounted on the side wall 62 of the apparatus housing 63 shown in FIG. 1. The depending arm of the bell crank 59 carries another swivel ball element 64 at its lower end engaging within a coacting yoke 65 having retainer cap 65', FIG. 8. The yoke 65 forms a part of a horizontally swingable shift lever 66 pivoted at 67 to base plate 50 of the apparatus. A second lever 30' is pivoted on a second pivot 31' to the base plate 50 and has a tubular hub 32' receiving loosely a slightly elongated opening 33' of the lever 66. A relatively strong retractible spring 34' has one end connected at 35' to the lever 30' and its opposite end 36' is connected with a notch in the underlying lever 66.

A solenoid 68 has its plunger connected through a rod 69 with an opening 70 in the lever 30' and a relatively weak return spring 71 is connected with the lever 30' through the same opening 70 in opposition to the solenoid 68. The other end of the spring 71 is suitably anchored to the base plate 50.

FIGS. 8 and 9 depict the capstan 53 separated from the cartridge pinch roller 73 or lowered therefrom when the cartridge 31 in question has been indexed to the play position and pulled down as in FIG. 3. The play position is indicated by the character P in the drawings. The return spring 71 is acting against the plunger of deenergized solenoid 68 and is holding the lever 30' in the position shown in FIG. 8 and the spring 34' is holding the lever 66 with one end of the elongated opening 33' abutting hub 32' as shown. The lever 66 is therefore held with respect to its pivot 67 so that the yoke 65 and element 64 are shifted to the left in FIG. 8 and also in FIG. 7. Through the belt crank 59 and pivot 60, the capstan 53 is therefore held downwardly and out of contact with the pinch roller 73. This is important because by this means the pinch roller is protected against damage by pressure against it when it is not rotating.

When the solenoid 68 is energized, its plunger overcomes the light spring 71 and turns the lever 30' clockwise, FIG. 8, until a stop element 37' contacts the lever 66. This positions the spring 34' at an angle enabling it to shift the lever 66 so that the opposite end of the elongated opening 33' will contact the hub 32', thus turning the lever 66 slightly clockwise on its pivot 67 or to the right in FIG. 8 and through the bell crank 69 and associated parts, shifting the capstan 53 upwardly into driving contact with the pinch roller 73 as shown in FIG. 9 and in FIG. 3.

Directly beneath the capstan 53 at the play position, FIG. 9, a bearing support 74 on base plate 50 supports a stub shaft 75 rotatably having a friction drive wheel 76 keyed to one end thereof immediately below the capstan 53 and also having a spur gear 77 keyed to its other end, as shown. A disc 78, slightly larger in diameter than the wheel 76, is mounted freely rotatably on the shaft 75 close to one side of the frictional wheel and between the latter and bearing support 74. A torsion type spring 79 surrounding a hub portion of the disc 78 has a connection with the disc, as shown, and another connection at 80 with the bearing support, whereby the spring yieldingly resists rotation of the disc 78 in one direction. The disc 78 has a depression 81 or recess at one point on its periphery to receive the capstan 53 so that the latter may actively engage the periphery of friction drive wheel 76 at a precise time. The remainder of the periphery of disc 78 projecting somewhat beyond the periphery of the wheel 76 prevents contact of the capstan with the wheel during a certain time delay period. The disc 78 prevents unwanted initiation of the cartridge change sequence in the event of power interruption or shut down of the unit. The mechanism shown in FIGS. 7 and 8 is effective at proper time during the operating cycle to move the rotary capstan 53 into driving contact with the pinch roller 73 at the play station, FIGS. 3 and 9, or into contact with the disc 78 and friction drive wheel 76, FIG. 4.

A further bearing block 82 fixed to the base plate 50 has parallel bearing sleeves 83 and 84 for parallel shafts 85 and 86, respectively. The shaft 86 carries a gear 87 adjacent one end of the sleeve 84 in mesh with gear 77 and another larger gear 88 is secured to the corresponding end of shaft 85 in mesh with the intermediate gear 87. The end of shaft 85 remote from gear 88 has a revolving crank head 89 firmly secured thereto for rotation therewith and this crank head has a crank pin 90 on its outer side connected with a drive link 91 whose operation will be described. The opposite or inner side of crank head 89 carries a roller 92 engaging the generally horizontal arm 93 of a bell crank 94 pivoted at 95 to the fixed bearing block 82. As shown best in FIG. 2, the bell crank 94 lies in a vertical plane between crank head 89 and the bearing sleeves 83. The generally upright arm 96 of bell crank 94 is connected with a retractile spring 97 whose opposite end is secured to a crank plate 98 on a horizontal rocker shaft 99 near one side of the base plate 50 adjacent the play station P. The rocker shaft 99 forms the driving component of a cartridge pull-down means 100 at the play station, to be described in detail. The rocker shaft 99 has its ends journaled in a U-shaped bearing bracket 101 firmly anchored to the base plate 50 through an upturned side flange 102 thereof.

The cartridge pull-down means 100 comprises a sturdy upright arm 103, U-shaped in cross section, FIG. 2, pivoted near its lower end to the horizontal shaft 99. The arm 103 lies immediately outwardly of the periphery of magazine 30 and thus the outer vertical edge wall of each tape cartridge 31 having the notch 48 moves adjacent to the arm 103 when indexed to the play station or position. The arm 103 is spring-loaded inwardly by a compression spring 104, as shown in the drawings, and the arm can be forced outwardly against the spring as a safety feature of the mechanism which will be described.

The pull-down means 100 further comprises a pull-down finger or lever 105 pivoted to the arm 103 near its upper end by an element 106. A rather strong torsion spring 107 on the pivot element 106 serves to bias the finger 105 upwardly to a cartridge release position as indicated in FIG. 4, and the spring 107 is strong enough to overcome the spring 97 at the proper time. The vertically swingable finger 105 is connected with a pull-down link 108, in turn having its lower end secured to a second radial crank plate 109 of rocker shaft 99. Substantially a parallelogram linkage is formed by the parts 103, 105, 108 and 109.

The extremity of finger 105 carries a cartridge pull-down roller 110 having tapered side faces 111, FIG. 2, for smooth contact with a coacting inclined face 112 of detent head 47. The arrangement is such that when the finger 105 is swung downwardly to engage the cartridge 31, the roller 110 will engage the inclined face 112 and push the detent head 47 laterally from the notch 48 of the cartridge, FIG. 6. Simultaneously, the roller 110 will enter the cartridge notch for pulling the cartridge down to the play position in FIG. 3 and thus there is no transition period when the cartridge is not securely held either by the detent head 47 or roller 110 on pull-down finger 105. If, at any time, the user should grasp the cartridge 31 while in the play position and pull it upwardly, the spring 104 will yield and permit removal of the cartridge without damage to the mechanism and this is the previously noted safety feature. Also, the spring 104 will compensate for any mis-positioning of the cartridge which might occur.

Downward movement of each tape cartridge 31 at the play station under influence of finger 105 is positively limited by contact with the top of tape guide bracket 114 suitably anchored to the base plate 50. This bracket has upstanding tape guide elements 113 arranged in laterally spaced pairs at its top, FIG. 2, which guide the magnetic tape 115 as it traverses the bottom of the cartridge during the playing cycle.

Returning to the power train means shown principally in FIGS. 2 and 3, the link 91 driven by the revolving crank head 89 is pivotally connected at 116 with a ratchet arm 117, forming part of the means to index the shaft 35 and the magazine 30. The arm 117 is formed to provide depressed ratchet teeth 118, see diagrammatic FIG. 10, corresponding in number to the tape cartridges 31 and being circumferentially spaced equidistantly around the shaft 35. The teeth 118 have inclined lower faces and vertical sides, as shown. The teeth 118 interfit with companion teeth 119 formed on a lower ratcheting wheel or member 120, also having detent recesses 121 formed in its periphery, corresponding in number and spacing to the teeth 118 and 119. The ratchet arm 117 is turnable on the shaft 35 while the wheel 120 is fixed to the vertical shaft 35. Through this arrangement, the ratchet arm 117 effects step-by-step indexing of the shaft 35 to position the tape cartridges 31 in succession at the play station P.

Figure 10:
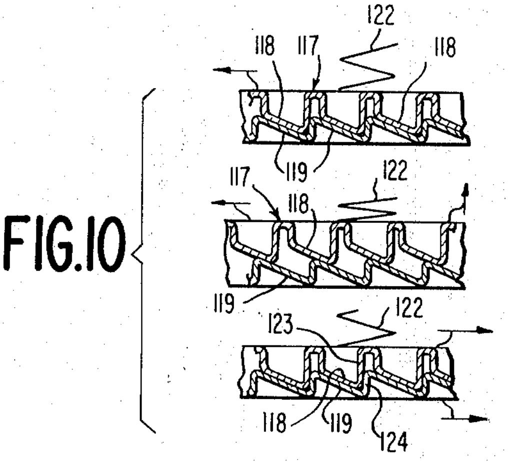
FIG. 10 is an enlarged fragmentary three position view of an escapement mechanism forming a part of the magazine indexing means.

Continuing to refer to FIG. 10, when the arm 117 is pulled by the link 91 in one direction, the opposed inclined faces of the teeth 118 and 119 will coact and slide and the arm 117 will move upwardly on the shaft 35 against the force of a spring 122 on the lower end portion of this shaft. The interfitting teeth 118 and 119 will thus shift relatively, circumferentially, a distance equal to the space between adjacent teeth or equal to the distance between tape cartridges. The spring 122 will then snap the teeth 118 and 119 back into engagement, as shown in FIG. 10C. At this time, the vertical walls 123 and 124 of the teeth are arranged so that turning of the arm 117 in the opposite direction will turn the wheel 120 and thus index the shaft 35 one step.

The wheel 120 is held at each indexed position by a spring-loaded ball detent 125 which engages the recesses 121. After each index step caused by turning of the arm 117 by link 91, the ball detent will hold the wheel 120 and shaft 35 in the indexed position while the arm 117 is being retracted and the coacting teeth 118 and 119 are moving as described in connection with FIG. 10, preparatory to the next index step as the crank head 89 revolves with the shaft 85.

The ball detent 125 is mounted within a housing base 126 of an upright sleeve 127 having bushings 128 within which the shaft 35 is journaled. A low friction thrust bearing 129 is interposed between the head 33 and the top of sleeve 127 to bear the weight of the entire magazine 30 and associated parts.

It should now be clear from the foregoing description and FIGS. 2 and 3 that the power train beginning with the motor 49 and extending through the capstan 53, friction wheel 76, spur gearing and associated parts, operates the indexing mechanism for the magazine 30, the cartridge pull-down means 100 and the actual movement of the magnetic tape in the play position due to contact of capstan 53 with the pinch roller 73. This complete cycle of operation will be further described.

In cooperation with the magazine indexing mechanism and the closely related cartridge pull-down and release means at the play station, there is provided a conventional magnetic pick-up (or record) head 130 mounted on an arm 131 having a threaded connection at 132 with a head displacement shaft 133. The shaft 133 is held on a bracket 134 having upstanding bearing parts 135 provided with openings which receive the shaft 133 slidably. A compression spring 136 is interposed between one bearing part 135 and the adjacent side of arm 131. This spring 136 provides both the compression force needed to follow the cam 138 and also the torsion required to maintain the magnetic head 130 in contact with the tape. The cam profile can be seen in enlarged FIG. 14. The entire bracket 134 may be adjusted somewhat on the main base plate 50 through the provision of an adjusting slot 139, locking screw 140 and notch 141 to receive the tip of a screwdriver.

A further basic adjustment of the magnetic head 130 and a very fine adjustment thereof is made through helical gears 142, one of which is equipped with a manual turning shaft 143 near and above the base plate 50. Turning of the shaft 143 results in turning the displacement shaft 133 whose threads 132 will adjust the arm 131 and head 130 relative to the displacement shaft.

This is a lateral adjustment to register the head 130 accurately with the tape track.

The mentioned displacement cam 138 has circumferentially spaced pins or legs 144 projecting from its lower side in surrounding relation to the vertical shaft 145 which supports the cam 138 rotatably. The purpose of the cam 138 whose profile periphery contacts the head 137 of displacement shaft 133 is to shift the magnetic head 130 minutely so that the pick-up elements 146 of the head will shift with respect to the plural (four) channels on each tape 115 during either stereo or monaural operation. Typically, the pick-up elements 146 will register with one pair of the eight tracks on a tape, there being two tracks per tape channel.

To turn the cam 138, a pawl 147 is provided urged by a spring 148 constantly into engagement with one of the lugs 144. The lug engaging tip of the pawl is also held upwardly by another spring element 149 bearing against the bottom of the pawl and the base plate 50. The tip of the pawl 147 has an arcuate notch 150 to embrace each lug or pin 144 in succession and one side of the pawl near its tip is recessed as at 151 to clear the shaft 145, FIG. 14. The pawl is further guided in its reciprocation by an arcuate slot 152 formed therethrough receiving a fixed anchorage pin 153 for the spring 148. As the pawl reciprocates, the slot 152 coacts with element 153 to step the pawl laterally so that it may properly engage the next lug or pin 144.

The pawl 147 is activated by the plunger 154 of a solenoid 155. Through this means, the magnetic head 130 is positioned to pick up a particular channel on the tape 115 in a conventional manner. As shown in FIG. 2, the magnetic head 130 is received between the two sides of bracket 114 with pick-up elements 146 facing upwardly to engage the tape as it travels through the tape guides 113 in the playing mode, caused by the capstan 53 driving the pinch roller 73. As explained, the torsion spring 136 biases the head 130 into contact with the tape when the tape cartridge 31 is in the full down or play position.

Figures 11, 12, 13, 14:
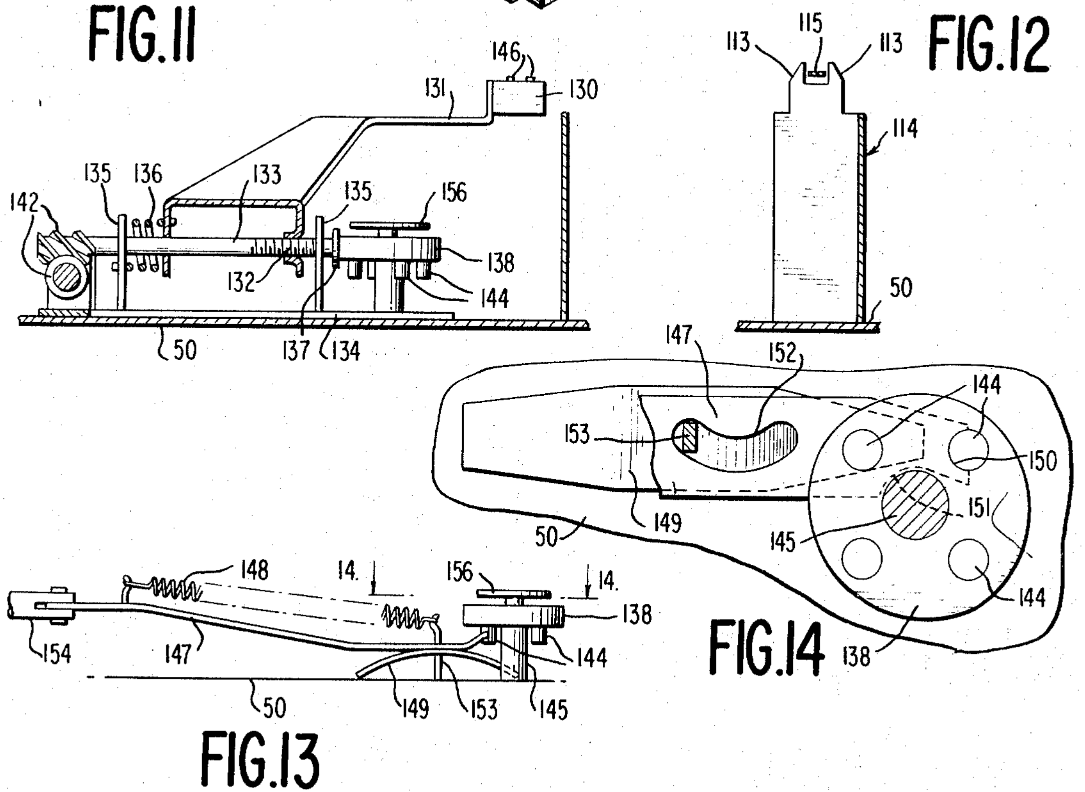
FIG. 11 is a fragmentary vertical section taken substantially on line 11—11 of FIG. 2.
FIG. 12 is a similar section taken on line 12—12 of FIG. 2.
FIG. 13 is a similar view taken on line 13—13 of FIG. 2.
FIG. 14 is an enlarged fragmentary horizontal section taken on line 14—14 of FIG. 13.

There is a rotary switch 156 on the cam 138, FIG. 13, and this switch is for two purposes. One purpose is to provide track display indication by lamps, and the other purpose is to provide a signal on channel number four which may be used in the logic system of the invention to call for cartridge index motion.

A pair of switch contacts indicated diagrammatically at 159 on the bracket 114 lie beneath the moving magnetic tape and sense the passage of the usual metal foil terminal near the end of the tape for one of three purposes, namely, to cause the magnetic head shift motion to be initiated, if command logic dictates this; to cause the cartridge change motion to initiate, if logic so dictates; or to cause both to be initiated if logic is so set.

Another rotating switch element 160 turns with the magazine indexing shaft 35 and by means of this switch any desired cartridge 31 can be selected manually from the control panel 161 indicated in FIG. 1.

SUMMARY OF OPERATION

Figure 15:
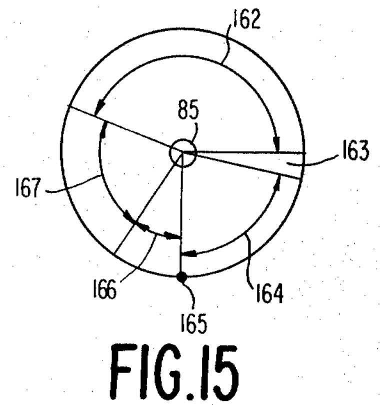
FIG. 15 is an operational cycle diagram depicting the various segments of the operating cycle of the apparatus during one revolution of a cycling shaft.

To a great extent, the cycle of operation of the apparatus can be understood by reference to FIG. 15 which is a cycle diagram based upon the rotary shaft 85. For every complete rotation of this shaft, the apparatus will pass through a complete operating cycle as regards the indexing of the magazine 30 and the pulling down of a particular tape cartridge 31 at the play station, the actual playing mode at this station and the release or return of the cartridge by the finger 105 to the elevated position shown in FIG. 4. Only the lateral movement of the magnetic head 130 to select channels on the tape is a separately controlled function dependent upon the solenoid 155 and associated elements, abovedescribed.

The diagram in FIG. 15 includes a relatively large cycle interval 162 which is the portion of the complete cycle concerned with indexing the magazine 30 to remove one cartridge from the play station P and to advance the next following cartridge to the play station. In order for this to take place, the solenoid 70 must be energized so that the elements 66 and 59 will move the capstan 53 downwardly into contact with the friction drive wheel 76. When this occurs, the friction drive wheel will activate the gears 77, 87 and 88 and the shaft 95 will turn, also turning the crank head 89 and crank pin 90 and through the link 91 and arm 117 and associated parts will cause a turning or indexing of the magazine 30 for the distance between adjacent teeth 118 which is the distance between cartridges.

While this indexing is taking place, the cartridge pull-down finger 105 must be elevated clear of the magazine by spring 107 and the roller 92 depicted in FIG. 4 will be out of engagement with the arm 93 so that the parts may assume the relative positions shown in FIG. 4. When the indexing cycle segment 162 is completed, there will be a small empty or idle gap 163 in the operating cycle, followed immediately by a pull-down cycle portion 164 during which the finger 105 enters the socket 48 of the indexed cartridge, pushing the detent head 47 aside and lowers the cartridge 31 to the play position against the bracket 114, FIG. 3. At this time, the capstan 53 must be removed by the return spring 71 upwardly and out of engagement with the friction drive wheel 76 and solenoid 70 will be de-energized because no rotary movement of the magazine 30 can be allowed to take place after the particular cartridge reaches the play station P and is engaged by the pull-down finger 105.

However, prior to separation of the capstan 53 from the friction drive wheel 76 through spring 71, the roller 92 on the interior side of crank head 89 must cycle during indexing and engage the arm 93 and turn bell crank 94 toward the position shown in FIG. 3. As this takes place, the bell crank through spring 97, crank plate 98, rocker shaft 99 and link 108 will begin to shift the finger 105 and roller 110 into engagement with the cartridge 31, and by the time the capstan 53 disengages the friction drive wheel 76, the cartridge will have been drawn downwardly to the use or play position shown in FIG. 3. The mechanism will remain in this position until the wheel 76 is again activated by the capstan due to being held by the detent 125. As shown, a projection 88' on one side of gear 88 engages the actuator of an interlock switch 89' secured to the bracket 114, FIG. 2. This engagement assures that at the correct points in the operating cycle, the capstan 53 will disengage the friction drive roller 76. At this point, the cartridge 31 is pulled down in the play position.

At this point in the operating cycle indicated by the numeral 165 in FIG. 15, the capstan 53 is engaging cartridge pinch roller 73 and the magnetic tape 115 is being driven relative to the magnetic head 130 in the play or record mode until the end of the tape is sensed by the contact means 150 coacting with the metal foil on the tape as previously explained. The actual playing portion of the cycle is a variable depending upon the number of channels utilized, up to four. Assuming that it is desired to utilize a second tape channel upon completion of one channel while in the playing mode, a signal from the contact means 159 will energize solenoid 155 and through the pawl 157 and one of the lugs 154, the displacement cam 138 will be turned so as to shift the shaft 133, arm 131 and magnetic head 130 laterally a small amount to position the head properly relative to the next selected tape channel. The four indexing lugs 144 on magnetic head displacement cam 138 correspond to the usual four channels on the tape. The mechanism has the capability of playing a single channel only, or two or three channels in succession, or four channels, while in the playing mode, FIG. 3, before the capstan 53 is shifted from contact with the pinch roller 73 preparatory to releasing and raising the cartridge 31 and then indexing the magazine 30 so as to bring the next cartridge to the playing station. It might be mentioned at this point, particularly in view of the safety spring 104, that there is nothing to preclude manual interchanging of the various cartridges 31 around the circumference of the magazine 30 by the user at any time.

When the tape 115 of the particular cartridge 31 at the playing station has been played through one or more channels and the playing mode is completed and the end of the tape is sensed by the contact means 159, a signal will de-energize the solenoid 70 and through movement of the arms 66 and 59, the continuously rotating capstan 53 will be shifted downwardly and away from pinch roller 73 and toward contact first with the time delay disc 78 which will turn against the force of spring 79 and secondly into contact with friction drive wheel 76 when the capstan reaches and enters notch 81 of the disc 78. As soon as the wheel 76 is again driven by the capstan, the cartridge release cycle portion indicated at 166 in FIG. 15 commences.

The crank head 89 from its position in FIG. 3 will begin to turn clockwise with shaft 85 and the roller 92 will begin to disengage and release the arm 93 of bell crank 94, whereby the release spring 107 of pull-down finger 105 is able to swing the finger upwardly toward the cartridge release position shown in FIG. 4 and in so doing the cartridge 31 is elevated to its normal position and as the roller 110 leaves the notch or socket 48, the spring-urged detent head 47 will automatically re-enter the notch 48 and secure and support the cartridge in the release or inactive position. While the above is taking place, the escapement teeth 118 and 119 shown in FIG. 10 are sliding reversely on their inclined contacting faces and conditioning themselves for the next, forward indexing of the magazine 30 shown by the cycle portion 162. This blank or idle increment of the cycle is indicated at 167 in FIG. 15. The cycle then repeats itself in the described manner to again index the magazine 30, to move another cartridge 31 to the play station, followed by automatic pull-down of the cartridge by the finger 105 and associated mechanism, followed by the actual playing mode, and then the release of the cartridge and the return thereof to its normal non-use position. The continuously rotating capstan 53 with its simple shifting means, FIGS. 7 and 8, allows the direct initiation of the magazine index to the playing station and the pulling down of the cartridge in proper sequence through a single drive linkage. This is followed by shifting of the capstan to engage the pinch roller 73 during the actual playing mode, during which period the magnetic head displacement cam 138 may or may not be activated by the pawl 147 and associated components depending upon the programmed logic. A second shifting of the capstan 53 away from the cartridge pinch roller and into engagement with the drive wheel 76 will accomplish the release and return of the cartridge to its normal non-use position preparatory to repeating the cycle. Hence, the entire operating cycle of the apparatus is achieved by an extremely simple and positive action mechanism.

It is believed that the various features and advantages of the present invention embodiment should now be readily apparent to one skilled in the art, without the requirement for further detailed description.

We claim:

1. A tape apparatus comprising a cartridge magazine adapted to carry a plurality of tape containing cartridges spaced circumferentially on the magazine, indexing mechanism connected with the magazine to index it in increments which correspond to the circumferential spacing of cartridges, a cartridge engaging and shifting means disposed at one station near the circumference of the magazine and including a movable element adapted to directly engage each cartridge in succession at said station and to shift each cartridge to a used position at said station, mechanism connected with said movable element to operate it and having a connection with said indexing mechanism, and continuously rotating power means operable between a first position in driving engagement with said indexing and second-named mechanisms to operate the same in a predetermined cycle and a second position in driving engagement with the tape of a cartridge in the use position at said station.

2. The structure of claim 1, wherein said magazine is a substantially vertical axis magazine rotating in a substantially horizontal plane, said magazine having plural substantially vertical slots therein for said cartridges, each cartridge having a socket recess in its outer side and said movable element of the cartridge engaging said shifting means entering said socket recess and pulling the cartridge down through said slot of the magazine to said use position.

3. The structure of claim 2, and a cooperating resilient detent means for each cartridge on said magazine releasably holding each cartridge in a raised non-use position and yielding in response to movement of the movable element to release the cartridge.

4. The structure of claim 2, and a positive stop on the apparatus at said station to limit the downward movement of each cartridge at said station under control of said movable element.

5. A tape apparatus comprising an indexable cartridge magazine adapted to carry a plurality of tape cartridges, means to index said magazine to position each tape cartridge in succession at a use station, means engaging each cartridge at the use station and shifting it to a use position at said station, a continuously rotating drive element at the use station, and means to shift said driving element into and out of driving engagement with a pinch roller of each cartridge at the use station, said means to shift said driving element comprising a shifting arm connected with the driving element, a second arm having a connection with the shifting arm and being pivoted, and electromechanical resilient means connected with the second arm to turn the same upon its pivot in opposite directions.

6. The structure of claim 5, and wherein the electromechanical resilient means comprises a third arm having a pivot and said arm having a loose connection with the third arm, a solenoid connected with the third arm to turn the same on its pivot, a spring connected with the third arm in opposing relation to said solenoid, and a second spring interconnecting the third and second arms and being swingable with the third arm relative to the second arm when the solenoid is energized to position the second spring so that its force is effective to turn the second arm on its pivot in a direction to shift the driving element into driving engagement with said pinch roller.

7. The structure of claim 6, and wherein said second spring is stronger than said spring in opposing relation to the solenoid.

8. A tape apparatus comprising a magazine having plural circumferentially spaced compartments for a like number of tape cartridges, power means connected with said magazine to index it in circumferential steps substantially equal to the spaces between the cartridges, a relatively fixed cartridge engaging and shifting means on the apparatus and engaging each tape cartridge in succession while the magazine is in a dwell period between index steps, said power means having a connection with said cartridge engaging and shifting means to coordinate the operation of the latter with the indexing of the magazine, said power means including a continuously rotating capstan operable to drivingly engage said cartridge engaging and shifting means when in a first position, and a cartridge stop element and tape guide on the apparatus near the engaging and shifting means and limiting the shifting of the cartridge in one direction by the shifting means and thereby establishing a use position for the cartridge, said capstan drivingly engaging the pinch roller of each cartridge when in a use position.

9. A magnetic tape apparatus comprising:

a. a rotary magazine for plural circumferentially spaced magnetic tape cartridges, said magazine having compartments in which the cartridges are shiftably held and include means for retaining the cartridges in non-use positions in the compartments;

b. an index mechanism cooperating with the magazine to index the magazine in steps to position each cartridge in succession at a use station;

c. an additional mechanism at said use station to engage each cartridge in succession and shift it in its compartment to use a position at said use station;

d. power means for the apparatus including a rotary driving element engageable selectively either with the tape of each cartridge while in said use position to drive the tape or with the index mechanism and said additional mechanism jointly to operate the last mentioned two mechanisms in predetermined timed relationship; and e. means for effecting said selective engagement of said driving element.

10. The structure of claim 9, and an element at said use station engaging each cartridge as it is shifted to the use position and positively limiting the movement of the cartridge at the use position.

11. A magnetic tape apparatus comprising;

a. a rotary magazine having a plurality of circumferentially spaced compartments for removably receiving and holding a like number of magnetic-tape containing cartridges;

b. means for rotationally stepping said magazine to place each of said compartments successively in an indexed position;

c. means for shifting a cartridge in a compartment located at said index position between a play position and a retractive position;

d. operating means interconnecting said stepping means and shifting means for fixed synchronized operation of the last mentioned two means;

e. means for operating said stepping means and said shifting means;

f. a capstan;

g. means for rotationally driving said capstan; and h. means for shifting the capstan between a first position in driving engagement with a magnetic tape contained in a cartridge in said play position and a second position in driving engagement with said operating means.

12. The structure of claim 11 wherein said operating means includes a primary friction drive wheel engageable by said capstan.

13. The structure of claim 11 and a resilient detent element for each cartridge on said magazine releasably holding each cartridge in said retracted position.

14. The structure of claim 13 wherein the cartridge shifting means comprises a pivoted arm near the periphery of the rotary magazine, spring means yieldingly urging said arm radially inwardly toward the center of the magazine and allowing the arm to move outwardly under loading, a cartridge pull-down finger pivoted to said arm, each cartridge having a notch receiving and pull-down finger, and linkage means interconnecting said pull-down finger and said operating means.

* * * * *